(12) United States Patent
Quijano et al.

(10) Patent No.: US 7,559,520 B2
(45) Date of Patent: Jul. 14, 2009

(54) APPARATUSES AND METHODS FOR SUPPORTING PERIPHERAL DEVICES

(75) Inventors: David Quijano, Magnolia, TX (US); Randall Martin, The Woodlands, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 68 days.

(21) Appl. No.: 10/913,820

(22) Filed: Aug. 6, 2004

(65) Prior Publication Data

US 2006/0027718 A1    Feb. 9, 2006

(51) Int. Cl.
*A47F 5/00* (2006.01)
(52) U.S. Cl. .................. 248/309.1; 361/681; 248/316.8
(58) Field of Classification Search ................. 248/917, 248/918, 919, 920, 309.1, 316.1, 316.8, 682; 348/829, 830, 831, 825, 827; 361/681
See application file for complete search history.

(56) References Cited

U.S. PATENT DOCUMENTS

| | | | | |
|---|---|---|---|---|
| 3,662,981 A * | 5/1972 | Hogrebe | ................ | 248/278.1 |
| 4,964,606 A * | 10/1990 | Beam et al. | ................ | 248/333 |
| 5,035,392 A * | 7/1991 | Gross et al. | ................ | 248/442.2 |
| 5,082,235 A * | 1/1992 | Crowther et al. | ........ | 248/231.41 |
| 5,122,941 A * | 6/1992 | Gross et al. | ................ | 362/276 |
| 5,292,099 A * | 3/1994 | Isham et al. | ................ | 248/442.2 |
| D366,478 S * | 1/1996 | Daniels et al. | ............. | D14/213 |
| D373,761 S * | 9/1996 | Yu | ............. | D14/451 |
| 5,701,347 A * | 12/1997 | Daniels et al. | ............. | 381/300 |
| 5,881,986 A * | 3/1999 | Hegarty | ................ | 248/442.2 |
| 5,904,328 A * | 5/1999 | Leveridge et al. | ........ | 248/124.1 |
| 6,043,976 A * | 3/2000 | Su | ................ | 361/686 |
| 6,158,704 A * | 12/2000 | O'Neill | ................ | 248/317 |
| 6,216,989 B1 * | 4/2001 | Shioya et al. | ............. | 248/122.1 |
| 6,290,200 B1 * | 9/2001 | Ko | ................ | 248/442.2 |
| 6,550,737 B1 * | 4/2003 | Sai et al. | ................ | 248/311.2 |
| 6,600,827 B2 * | 7/2003 | Lu | ................ | 381/388 |
| 6,796,536 B1 * | 9/2004 | Sevier, IV | ................ | 248/121 |
| 6,839,227 B1 * | 1/2005 | Correa | ................ | 361/683 |
| 7,369,401 B1 * | 5/2008 | Floersch et al. | ............. | 361/681 |
| 2003/0231460 A1* | 12/2003 | Moscovitch | ................ | 361/681 |
| 2004/0011938 A1* | 1/2004 | Oddsen, Jr. | ................ | 248/393 |
| 2005/0205728 A1* | 9/2005 | Avery | ................ | 248/149 |
| 2005/0258319 A1* | 11/2005 | Jeong | ................ | 248/176.1 |

* cited by examiner

*Primary Examiner*—A. Joseph Wujciak, III

(57) ABSTRACT

In one embodiment, an apparatus for supporting a peripheral device includes a yoke that is adapted to attach to a rear of a display, the yoke including at least one arm that is adapted to extend to a side of the display so that an end of the at least one arm is positioned adjacent a side edge of the display, the end including a peripheral device mounting element.

20 Claims, 5 Drawing Sheets

APPARATUSES AND METHODS FOR SUPPORTING PERIPHERAL DEVICES

BACKGROUND

Peripheral devices are often used in conjunction with a computer, such as a desktop personal computer (PC). For instance, a microphone, speakers, or a web camera may be used during communication over the Internet, or during other use of the computer.

Recently, efforts have been made to reduce the space occupied by computers on users' desktops. To cite one example, traditional cathode ray tube (CRT) monitors are being quickly replaced by flat panel displays such as liquid crystal displays (LCDs). Given that such displays are much smaller, they create desktop space that otherwise would be occupied by a conventional CRT monitor.

Although such space-saving measures are available, the peripheral devices, such as those noted above, normally still occupy desktop space and increase the clutter of the user's work space.

SUMMARY

In one embodiment, an apparatus for supporting a peripheral device includes a yoke that is adapted to attach to a rear of a display, the yoke including at least one arm that is adapted to extend to a side of the display so that an end of the at least one arm is positioned adjacent a side edge of the display, the end including a peripheral device mounting element.

BRIEF DESCRIPTION OF THE DRAWINGS

The disclosed apparatuses and methods can be better understood with reference to the following drawings. The components in the drawings are not necessarily to scale.

DETAILED DESCRIPTION

As is identified above, peripheral devices that are used in conjunction with a computer, such as a desktop personal computer (PC), typically occupy desktop space. Given the interest in increasing the amount of free desktop space and in reducing desktop clutter, it would be beneficial to support such peripheral devices other than by simply placing them on the desktop or other available work surface.

As is described in the following, disclosed herein are peripheral device mounting apparatuses that support peripheral devices that are used in conjunction with a computer so that the peripheral devices do not occupy desktop space. In one embodiment, the mounting apparatus includes at least one arm that mounts to the rear of a flat panel display and extends to a side edge of the display such that a peripheral device can be mounted to that end in close proximity to the side edge. In such a case, the peripheral device is supported above the desktop and in the line of sight of the user. Moreover, the peripheral device is displaced along with the display when the display position is adjusted, for instance when the height of the display is increased or decreased, thereby keeping the peripheral device within the user line of sight.

Figure 1:
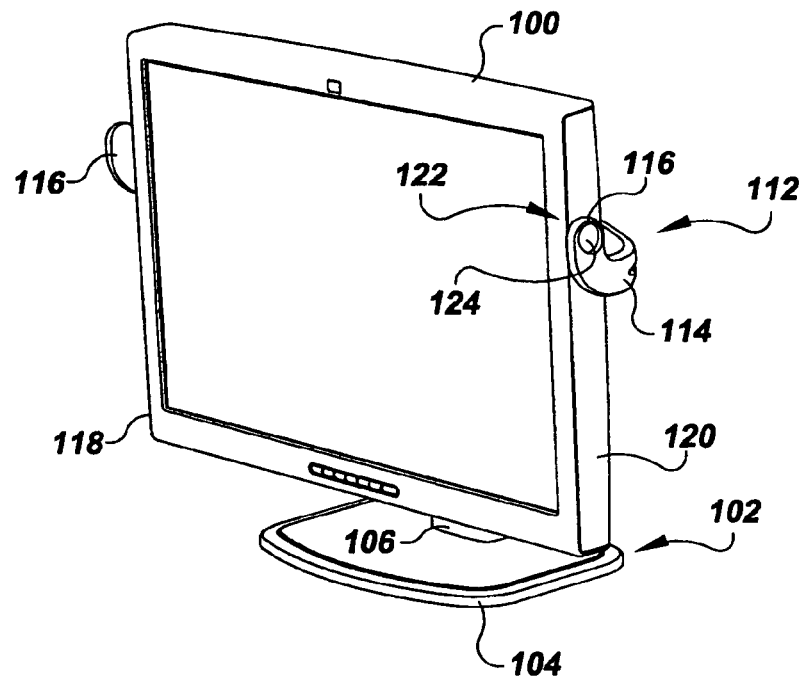
FIG. 1 is a front perspective view of a flat panel display that is equipped with a first example peripheral device mounting apparatus.
Figure 2:
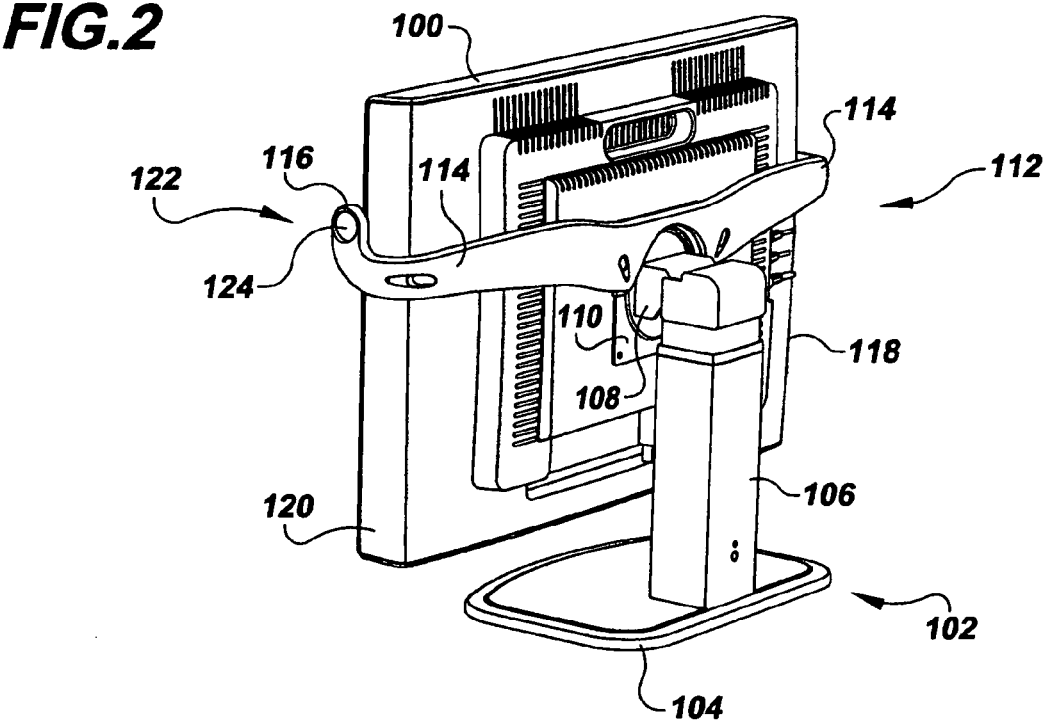
FIG. 2 is a rear perspective view of the display and mounting apparatus shown in FIG. 1.

Referring now in more detail to the drawings, in which like numerals indicate corresponding parts throughout the several views, FIGS. 1-6 illustrate a first example peripheral device mounting apparatus. With reference first to FIGS. 1 and 2, shown is a flat panel display 100. Although a flat panel display is illustrated, the disclosed mounting apparatus could be used with other types of displays if specifically configured for such an application. For purposes of the present disclosure, however, the display is presumed to comprise a flat panel display. By way of example, the flat panel display 100 comprises a liquid crystal display (LCD), a light emitting diode (LED) display, or a plasma display.

The display 100 is mounted on a stand 102, which includes a base 104 and a support column 106. The base 104 is configured to be placed on a desktop or other work surface, and the support column 106 extends upward from the base to enable mounting of the display 100 at a position within the line of sight of a user. As is apparent from FIG. 2, extending laterally from a top end of the support column 106 is a support arm 108 that includes a mounting plate 110 at its distal end. By way of example, the support arm 108 can pivot relative to the support column 106 so that the angle of the mounting plate 110, and therefore the display 100, relative to the user can be adjusted.

With reference to both FIGS. 1 and 2, the peripheral device mounting apparatus includes a yoke 112 that is attached to the rear of the display 100. More particularly, the yoke 112 is attached to the mounting plate 110 of the support 102 so as to therefore mount to the rear of the display 100. The yoke 112 includes arms 114 that extend out from the mounting plate 110 and terminate in ends 116 that are positioned adjacent opposed side edges 118, 120 of the display 100. Although the ends 116 of the arms 114 are positioned proximate to the side edges 118, 120 of the display 100, the arms are not, at least in the embodiment of FIGS. 1 and 2, attached to those side edges.

As is apparent from FIGS. 1 and 2, the ends 116 are generally positioned near the center (from top to bottom) of the display 100 so as to be easily viewable when one looks at the display. Each end 116 includes a peripheral device mounting element 122. In the illustrated embodiment, the mounting element 122 includes a recess 124 in which an opening is provided (see FIGS. 5 and 6).

Figure 3:
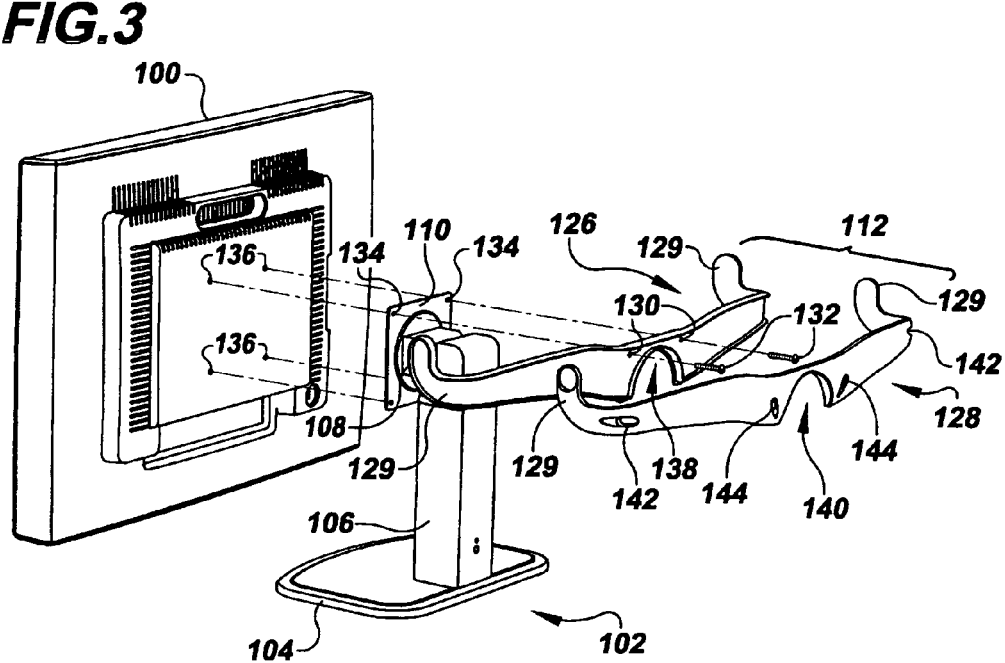
FIG. 3 is a perspective view of the display and mounting apparatus of FIGS. 1 and 2, with a yoke of the mounting apparatus shown exploded.

FIG. 3 illustrates the construction and mounting of the yoke 112 in greater detail. As is shown in that figure, the yoke 112 includes a first or front portion 126 and a second or rear portion 128 that connect to each other, for instance through a snap fit, to form the yoke. By way of example, each portion 126, 128 comprises a plastic, injection-molded piece. Each portion 126, 128 is curved adjacent its respective ends such that the arms 114 wrap around the side edges 118, 120 of the display 100 to position the yoke ends 116 near the front surface of the display (see FIGS. 1 and 2). In addition, each portion 126, 128 includes a vertically-extending portion 129 at its respective ends that extends along a vertical direction (upward in the example of FIG. 3) along the side edges 118, 120 of the display 100. As is discussed below in relation to FIG. 7, those portions 126, 128 displace the mounting elements 122 of the yoke 112 along the vertical direction (away from the centers of the side edges 118, 120) to provide space so that multiple peripheral devices can be mounted along each side of the display 100.

Provided in the front portion 126 are openings 130 that are adapted to receive screws 132 that extend through the openings, through mounting holes 134 provided in the mounting plate 110 of the stand 102, and into mounting holes 136 of the display 100. For instance, two openings 130 can be provided in the front portion 126 of the yoke 112 (e.g., through bosses formed in the front portion) such that the yoke can be attached to the display 100 using two screws 132 that are received by two mounting holes 136 of the display 100. By way of example, the mounting holes 134 of the mounting plate 110 and the mounting holes 136 of the display 100 are positioned and spaced in compliance with standards set by the Video Electronics Standards Association (VESA). In such a case, the openings 130 of the front portion 126 of the yoke 112 are spaced from each other about 100 millimeters (mm) to enable attachment of the yoke to VESA-compliant mounting holes. To enable such mounting of the yoke 112 to the display 100, the front and rear portions 126 and 128 of the yoke include notches 138 and 140, respectively, that provide space for the support arm 108 (see FIG. 2).

As is apparent in FIG. 3, the rear portion 128 of the yoke 112 comprises the mounting elements 122. In addition, the rear portion 128 can include distal and proximal cable routing openings 142 and 144, respectively, that enable cables that attach to a mounted peripheral device to be routed within the yoke 112 to reduce clutter and improve aesthetics. Specifically, a cable extending from a peripheral device mounted at an end 116 of the yoke 112 can enter an interior space defined by the assembled front and rear portions 126 and 128 adjacent the end of the yoke through a distal opening 142, and exit the interior space adjacent the support column 106 through a proximal opening 144 (see, e.g., FIG. 6).

Figure 4:
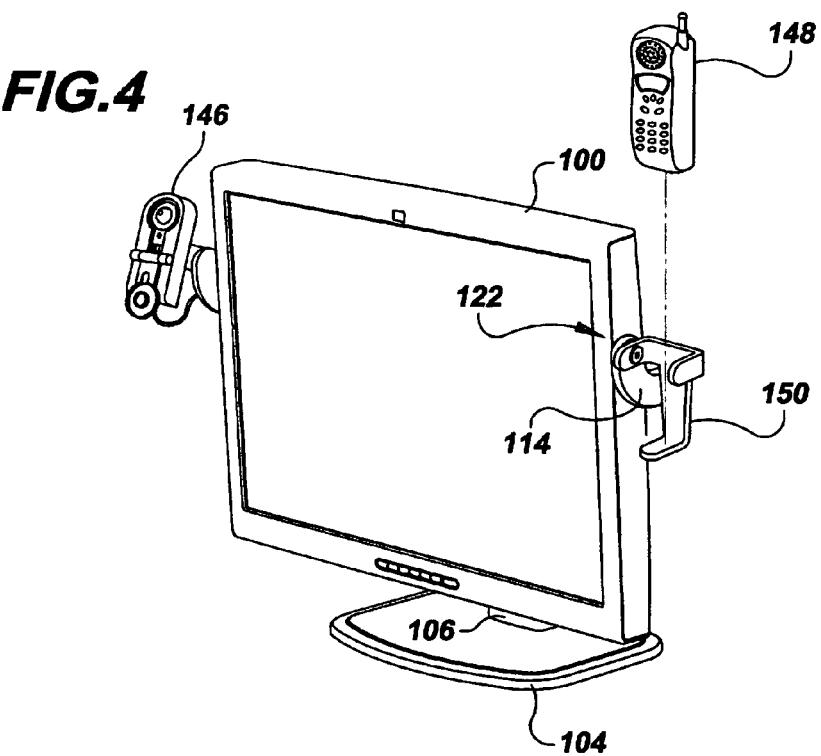
FIG. 4 is a front perspective view of the display and mounting apparatus of FIGS. 1-3, with the mounting apparatus shown supporting peripheral devices.

FIG. 4 illustrates attachment of peripheral devices to the peripheral device yoke 112. More specifically, illustrated is mounting of a web camera 146 and a telephone handset 148 at opposed sides of the display. Although a web camera 146 and handset 148 are specifically illustrated for purposes of example, other peripheral devices can be mounted using the apparatus. For instance, the apparatus can be used to mount microphones, speakers, personal digital assistants (PDAs), and any other relatively small, external peripheral device that is to be used in conjunction with a computer. Moreover, the apparatus can be used to mount devices that are not technically used in conjunction with the computer. For instance, although a telephone handset may be used to enable voice-over IP in conjunction with a computer, the handset may instead simply comprise a mobile telephone handset that the user wishes to support adjacent the display 100 (e.g., so as to be accessible while working on the computer). As is apparent in FIG. 4, the telephone handset 148 can, for example, be received by a cradle 150 that is attached to the yoke 112.

Figure 5:
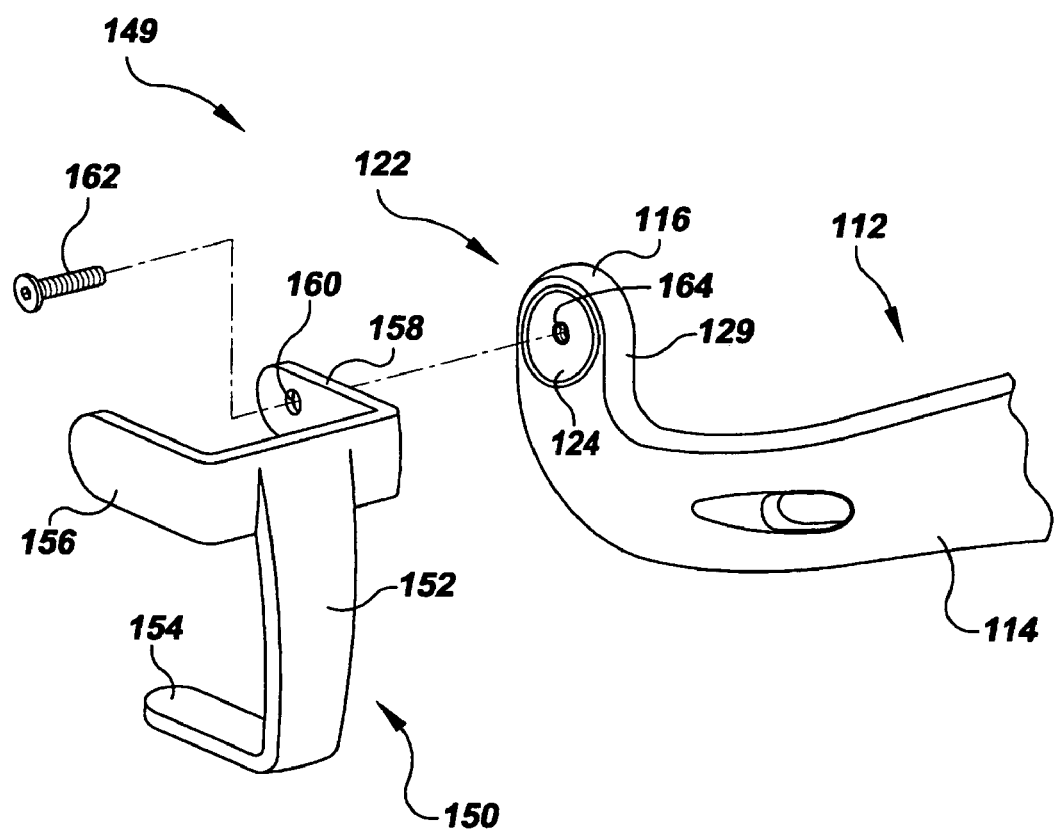
FIG. 5 is a partial perspective view of a first example attachment mechanism used to attach a peripheral device to the yoke of the mounting apparatus.
Figure 6:
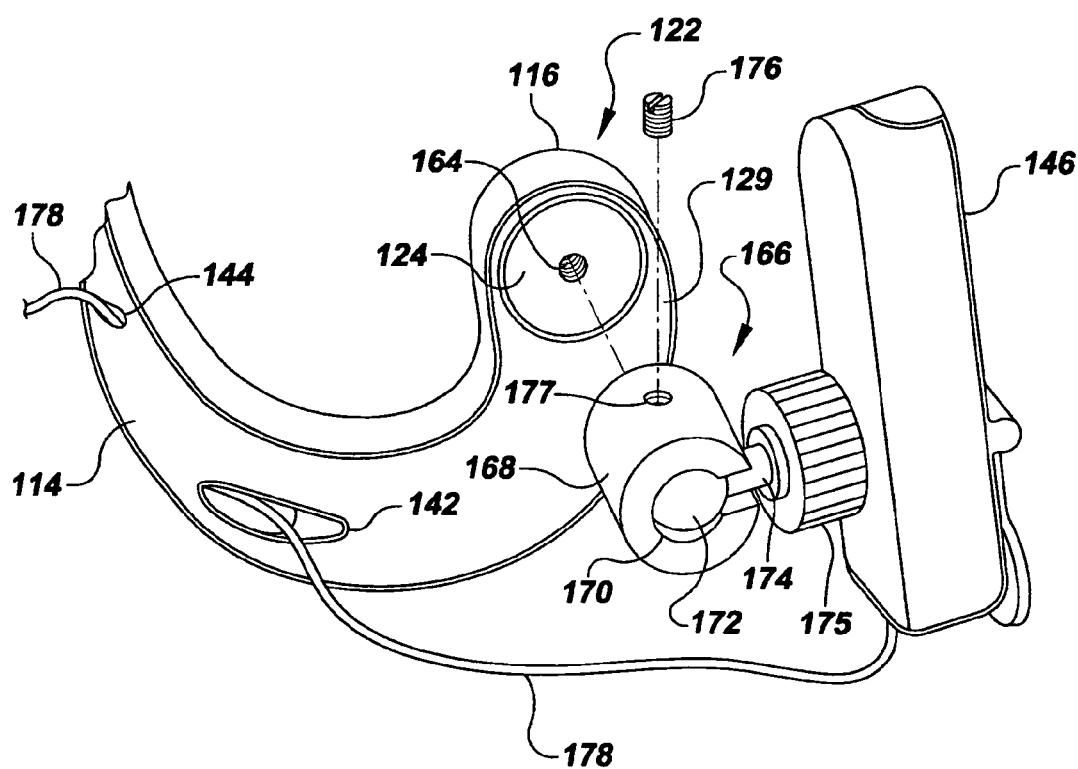
FIG. 6 is a partial perspective view of a second example attachment mechanism used to attach a peripheral device to the yoke of the mounting apparatus.

FIGS. 5 and 6 illustrate two example arrangements for attaching a peripheral device to the yoke 112. More specifically, FIG. 5 illustrates a swivel mechanism for mounting a peripheral device, in this case the handset 148, and FIG. 6 illustrates a ball joint mechanism for mounting a peripheral device, in this case the web cam 146. In each figure, the attachment mechanism is shown exploded from the yoke 112.

Beginning with FIG. 5, the swivel mechanism 149 comprises the cradle 150 first shown in FIG. 4. The cradle 150 comprises an elongated body 152, a base support 154 that extends from a bottom end of the body, and opposed side supports 156, 158 that extend from sides of the body adjacent a top end of the body. As is depicted in FIG. 5, the side support 158 that is closest to the yoke 112 includes an opening 160 through which a screw 162 or other fastener can pass to thread into a threaded opening 164 provided in the recess 124 of the yoke 112. With such a configuration, the cradle 150 can rotate or swivel about the screw 162, as long as the screw is not fully tightened. Accordingly, the cradle 150 can be rotated into a desired position, for instance one in which a display of the telephone handset 148 can be most easily viewed, and the screw 162 can be tightened to fix the cradle in that orientation.

Turning next to FIG. 6, illustrated is a ball joint mechanism 166 that is used to attach the web camera 146 (FIG. 4) to the yoke 112. As is indicated in FIG. 6, the ball joint mechanism 166 includes a generally cylindrical barrel 168 that includes a socket 170 that is adapted to receive a ball 172. Like the swivel mechanism 149 of FIG. 5, the barrel 168 can mount to the yoke 112 using a screw or other fastener (not visible in FIG. 6) that extends into the opening 164 provided in the recess 124.

Extending from the ball 172 is a threaded stem 174 that supports a collar 175. In such a scenario, a peripheral device, such as the web camera 146, can be threaded onto the stem so as to attach to the device to the yoke 112. Due to the nature of the ball 172 and socket 170, the stem 174, and therefore the attached peripheral device, can be manipulated into various orientations (i.e., radial orientations with the center being the center of the ball). Therefore, as with the swivel mechanism 149, a desired orientation can be selected by the user. Once a desired orientation has been achieved, the ball 172 can be locked into place with a set screw 176 that extends into a threaded opening 177 of the barrel 168.

In cases in which the peripheral device includes a cable, in this case cable 178 that connects to the web camera 146, the cable can be routed through the yoke 112 to provide convenient and tidy means for cable management. In particular, the cable 178 is routed so that it enters the opening 142 of the yoke 112, travels along the length of the arm 114, and exits the arm through the opening 144. By way of example, this routing is performed prior to attachment of the rear portion 128 of the yoke 112 to the front portion 126 of the yoke.

Figure 7:
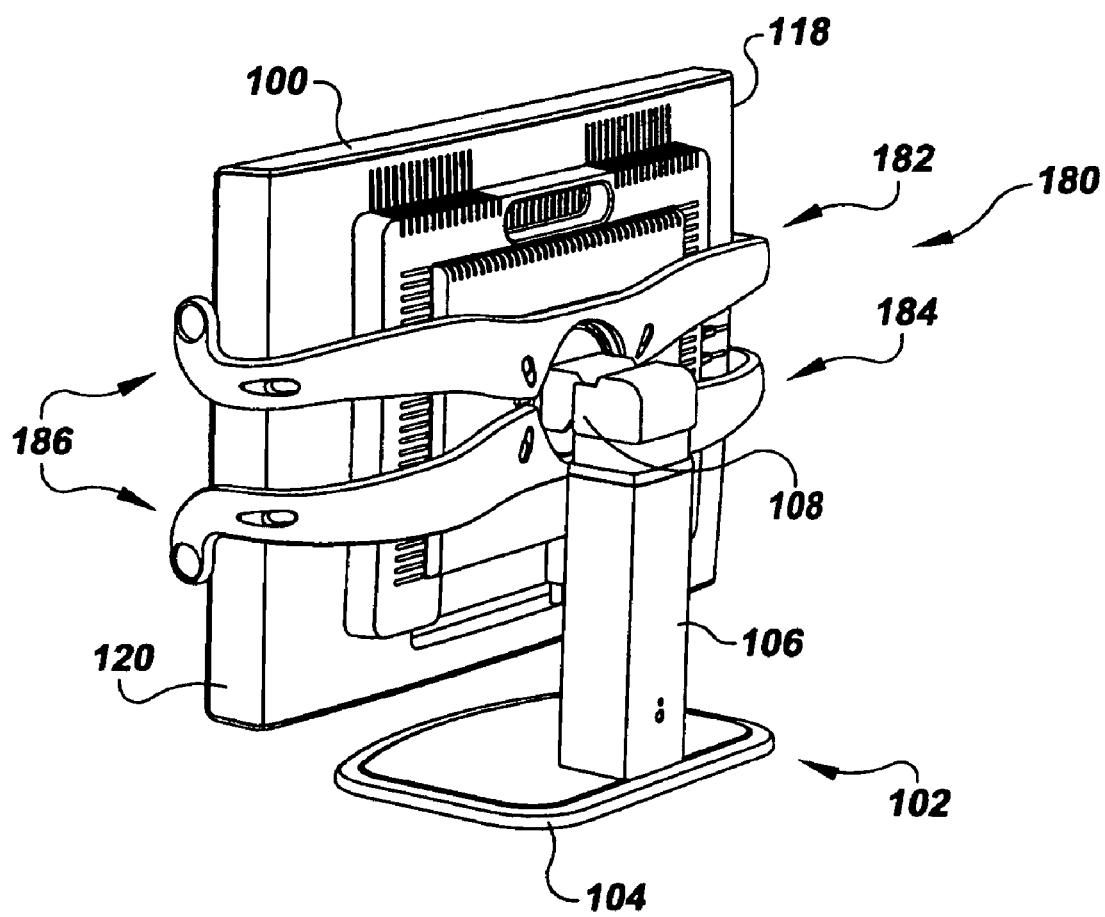
FIG. 7 is a rear perspective view of a flat panel display that is equipped with a second example peripheral device mounting apparatus.

FIG. 7 illustrates an alternative peripheral device mounting apparatus 180. The apparatus 180 includes two armatures 182 and 184 that, in this embodiment, are identical to each other although inverted relative to each other. Specifically, the first yoke 182 is mounted in the same manner as the yoke 112 shown in FIG. 2 using the top two mounting holes of the display 100, and the second yoke 184 is inverted relative to the first yoke and mounted to the display using the bottom two mounting holes of the display. In such an arrangement, a total of four peripheral devices may be supported by the mounting apparatus, with one peripheral device being attached to each of the four ends 186 of the armatures 182, 184 (only two ends visible in FIG. 7). Other aspects of the armatures 182, 184, at least in some embodiments, are identical to those described in the foregoing relative to the yoke 112.

What is claimed is:

1. Apparatus for supporting a peripheral device adjacent a side edge of a computer display such that the peripheral device can be viewed by a user when facing the computer display, the apparatus comprising:

a yoke that is adapted to attach to a vertically-oriented mounting plate of a display stand that supports the computer display such that the yoke is supported by the mounting plate above a support surface on which the display stand rests and the yoke therefore does not contact the support surface, the yoke including at least one arm that is adapted to extend beyond the side edge of the computer display so that an end of the at least one arm is positioned beyond the side edge of the computer display, the end including a peripheral device mounting element adapted to support the peripheral device adjacent the side edge of the computer display;

wherein the yoke includes openings that are adapted to route a cable of a peripheral device that is mounted to the yoke and wherein the yoke includes a front portion and a rear portion, the front and rear portions defining an interior space through which the cable can be routed;

wherein the yoke includes mounting holes that are arranged to align with mounting holes of the display stand mounting plate such that the yoke is adapted to secure to a first side of the display stand mounting plate when the computer display is positioned on a second, opposite side of the mounting plate and fasteners are passed through the yoke and mounting plate mounting holes and into the display;

wherein the yoke is adapted to provide no support to the computer display but instead can be added to the display stand for the purpose of supporting the peripheral device adjacent the side edge of the computer display.

2. The apparatus of claim 1, wherein the yoke includes two contiguous arms, one arm adapted to extend beyond a first lateral side of the computer display and another arm adapted to extend beyond a second lateral side of the computer display.

3. The apparatus of claim 1, wherein the yoke mounting holes are arranged to align with VESA-compliant mounting holes of the display.

4. The apparatus of claim 1, wherein the at least one arm includes a vertically-extending portion at its end.

5. The apparatus of claim 1, wherein the mounting element at the end of the at least one arm includes an opening that is adapted to receive a fastener.

6. The apparatus of claim 5, wherein the opening is a threaded opening that is adapted to receive a threaded fastener.

7. The apparatus of claim 5, wherein the opening is provided within a recess formed at the end of the at least one arm.

8. The apparatus of claim 1, further comprising a peripheral device attachment mechanism that attaches to the mounting element at the end of the at least one arm.

9. The apparatus of claim 8, wherein the attachment mechanism is a swivel mechanism.

10. The apparatus of claim 9, wherein the swivel mechanism includes a device cradle.

11. The apparatus of claim 8, wherein the attachment mechanism is a ball joint mechanism.

12. The apparatus of claim 1, wherein the mounting element is adapted to mount at least one of a telephone handset, web camera, microphone, speaker, and personal digital assistant (PDA).

13. Mounting apparatus for mounting peripheral devices adjacent sides of a flat panel display such that the peripheral devices can be viewed by a user when facing the display, the apparatus comprising:

a yoke that is adapted to attach to a mounting plate of a display stand that supports the display with fasteners that can be passed through openings in the yoke that align with mounting holes of the mounting plate and the display, the yoke including opposed arms that extend outward from the openings in the yoke so as to be adapted to position ends of the arms beyond opposed sides of the display, each end of the arms including a mounting element, the yoke further including openings that are adapted to route cables of peripheral devices through an interior space of the yoke that is defined by a front portion and a rear portion of the yoke that attach together; and a peripheral device attachment mechanism that is adapted to support a peripheral device adjacent the sides of the display and that attaches to one of the yoke mounting elements;

wherein the yoke provides no support to the display but instead can be added to the display stand for the purpose of supporting the peripheral devices adjacent the sides of the display.

14. The apparatus of claim 13, wherein the openings in the yoke that align with the mounting holes of the display are VESA-compliant.

15. The apparatus of claim 13, wherein each arm includes a vertically-extending portion at its end in which the mounting element is provided.

16. The apparatus of claim 13, wherein the mounting element of each arm end further includes a recess in which the opening is provided.

17. The apparatus of claim 13, wherein the peripheral device attachment mechanism attaches to the mounting element with a threaded fastener that threads into the opening in the end of the arm to which it is attached.

18. The apparatus of claim 17, wherein the attachment mechanism is a swivel mechanism.

19. The apparatus of claim 17, wherein the attachment mechanism is a ball joint mechanism.

20. The apparatus of claim 13, wherein the mounting apparatus is adapted to mount at least one of a telephone handset, web camera, microphone, speaker, and personal digital assistant (PDA).

* * * * *